(12) United States Patent
Cirucci et al.

(10) Patent No.: US 12,528,042 B2
(45) Date of Patent: Jan. 20, 2026

(54) DEVICE, SYSTEM, AND METHOD FOR CARBON DIOXIDE CAPTURE IN HUMID CONDITIONS

(71) Applicant: ARIZONA BOARD OF REGENTS ON BEHALF OF ARIZONA STATE UNIVERSITY, Scottsdale, AZ (US)

(72) Inventors: John Cirucci, Scottsdale, AZ (US); Klaus Lackner, Longmont, CO (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 327 days.

(21) Appl. No.: 18/255,082

(22) PCT Filed: Dec. 8, 2021

(86) PCT No.: PCT/US2021/062492
§ 371 (c)(1),
(2) Date: May 30, 2023

(87) PCT Pub. No.: WO2022/125718
PCT Pub. Date: Jun. 16, 2022

(65) Prior Publication Data
US 2024/0017202 A1    Jan. 18, 2024

Related U.S. Application Data

(60) Provisional application No. 63/123,219, filed on Dec. 9, 2020.

(51) Int. Cl.
*B01D 53/04* (2006.01)
*B01D 53/047* (2006.01)
*B01D 53/26* (2006.01)

(52) U.S. Cl.
CPC ..... *B01D 53/0454* (2013.01); *B01D 53/0438* (2013.01); *B01D 53/0446* (2013.01);
(Continued)

(58) Field of Classification Search
CPC .............. B01D 53/0454; B01D 53/0438; B01D 53/04; B01D 53/0446; B01D 53/0462;
(Continued)

(56) References Cited

U.S. PATENT DOCUMENTS 4,270,937 A    6/1981 Adler
4,324,564 A *  4/1982 Oliker .................... B01D 53/06
                                                   95/137

(Continued)

FOREIGN PATENT DOCUMENTS

CA    2688687    11/2008
DE     882541     7/1953
(Continued)

OTHER PUBLICATIONS

Department of the Army, U.S. Army Corps of Engineers, Mar. 1, 2001, "Engineering and Design: Adsorption Design Guide," Design Guide No. 1110-1-2.
(Continued)

*Primary Examiner* — Frank M Lawrence, Jr.
(74) *Attorney, Agent, or Firm* — FULLER IP LAW LLC; Rodney J. Fuller

(57) ABSTRACT

A device, method, and system for $CO_2$ capture is disclosed. The method includes receiving a process vapor including water and $CO_2$ into a vessel at an intake pressure, the vessel having a desiccant and a $CO_2$ sorbent material. The method includes passing the process vapor through the desiccant and sorbent, the desiccant absorbing the water resulting in a dry vapor, the sorbent absorbing $CO_2$ from the dry vapor resulting in a $CO_2$-lean dry vapor. The method includes discon-
(Continued)

tinuing the process vapor, desorbing the water from the desiccant by at least one of reducing pressure downstream from the desiccant to below the intake pressure and increasing a temperature of the desiccant, desorbing the $CO_2$ from the sorbent by placing the desorbed water in contact with the sorbent, removing the desorbed $CO_2$ through the product outlet as a product stream, and desorbing a remaining water from the desiccant and the sorbent.

20 Claims, 8 Drawing Sheets

(52) U.S. Cl.
CPC ....... B01D 53/0462 (2013.01); B01D 53/047 (2013.01); B01D 53/261 (2013.01); B01D 2253/102 (2013.01); B01D 2253/108 (2013.01); B01D 2253/206 (2013.01); B01D 2257/504 (2013.01); B01D 2258/06 (2013.01); B01D 2259/40088 (2013.01); B01D 2259/40092 (2013.01)

(58) Field of Classification Search
CPC ................ B01D 53/047; B01D 53/261; B01D 2253/102; B01D 2253/108; B01D 2253/206; B01D 2257/504; B01D 2258/06; B01D 2259/40088; B01D 2259/40092; B01D 2253/202; B01D 2257/80; B01D 2259/65; Y02C 20/40
USPC ......... 96/109, 111, 121, 126, 132, 143, 144, 96/145, 146; 95/8, 10, 11, 96–99, 101, 95/102, 104–106, 114, 115, 117, 121, 95/139; 423/230
See application file for complete search history.

(56) References Cited

U.S. PATENT DOCUMENTS

| | | | | |
|---|---|---|---|---|
| 5,755,857 A * | 5/1998 | Acharya | ............ | B01D 53/0462 96/132 |
| 5,759,236 A | 6/1998 | Thomas | | |
| 9,283,510 B2 | 3/2016 | Lackner | | |
| 11,559,762 B1 | 1/2023 | Kuo | | |
| 2009/0173073 A1 | 7/2009 | Guidati | | |
| 2009/0232861 A1 * | 9/2009 | Wright | ................ | B01D 61/445 423/437.1 |
| 2011/0203311 A1 | 8/2011 | Wright | | |
| 2011/0265512 A1 | 11/2011 | Bearden | | |
| 2011/0296872 A1 | 12/2011 | Eisenberger | | |
| 2012/0312020 A1 | 12/2012 | Hume | | |
| 2013/0047664 A1 | 2/2013 | Dicenzo | | |
| 2013/0255597 A1 | 10/2013 | Hall | | |
| 2014/0331864 A1 | 11/2014 | Ogino | | |
| 2016/0207037 A1 * | 7/2016 | Lackner | ................ | B01D 53/02 |
| 2017/0203249 A1 | 7/2017 | Gebald | | |
| 2019/0022574 A1 | 1/2019 | Jin | | |
| 2020/0001225 A1 * | 1/2020 | Ritter | ................... | C12M 47/18 |
| 2020/0009494 A1 | 1/2020 | Ritter | | |
| 2020/0309451 A1 | 10/2020 | Abarr | | |
| 2021/0187434 A1 | 6/2021 | Gebald | | |
| 2021/0187438 A1 * | 6/2021 | Nishibe | ................. | B01D 53/83 |
| 2024/0017203 A1 | 1/2024 | Cirucci | | |
| 2024/0024811 A1 | 1/2024 | Cirucci | | |

FOREIGN PATENT DOCUMENTS

| | | |
|---|---|---|
| EP | 1710008 | 10/2006 |
| EP | 2564914 | 3/2013 |
| FR | 3025300 | 3/2016 |
| WO | 2012111495 A1 | 8/2012 |
| WO | 2019238488 | 12/2019 |
| WO | 2021188547 | 9/2021 |
| WO | 2022125717 | 6/2022 |
| WO | 2022125718 | 6/2022 |

OTHER PUBLICATIONS

Jacob, et al., (2015), "Energy Release Pathways in Nanothermites Follow Through the Condensed State," Combustion and Flame, 162, pp. 258-264.
Keith, et al. (2018), "A Process for Capturing CO2 from the Atmosphere," Joule, V2, 1573-1594.
Rezaei, et al. (2010), "Structured Adsorbents in Gas Separation Processes," Separation and Purification Technolgoy, 70, pp. 243-256.
Santori et al. (2018), "Adsorption artificial tree for atmospheric carbon dioxide capture, purification and compression," Energy, Elsevier, Amsterdam, NL, vol. 162, Aug. 14, 2018, pp. 1158-1168.
Wang, T., Lackner, K. S., & Wright, A. (2011). "Moisture swing sorbent for carbon dioxide capture from ambient air." Environmental science & technology, 45(15), 6670-6675.
Wang, T., Lackner, K. S., & Wright, A. B. (2013). "Moisture-swing sorption for carbon dioxide capture from ambient air: a thermodynamic analysis." Physical Chemistry Chemical Physics, 15(2), 504-514.
Wurzbacher et al. Concurrent Separation of CO2 and H2O from Air by Temperature Vacuum Swing Adsorption/ Desorption Cycle. Environ. Sci. Technol. 2012, 46, 991-9198. (Year: 2012).
Wynnyk Kyle G., Hojjati Behnaz, Marriott Robert A., "Sour Gas and Water Adsorption on Common High-Pressure Desiccant Materials: Zeolite 3A, Zeolite 4A, and Silica Gel", Journal of Chemical and Engineering Data., American Chemical Society., US, US, (Jul. 11, 2019), vol. 64, No. 7, doi:10.1021/acs.jced. 9b00233, ISSN 0021-9568, pp. 3156-3163, XP055950184.

* cited by examiner

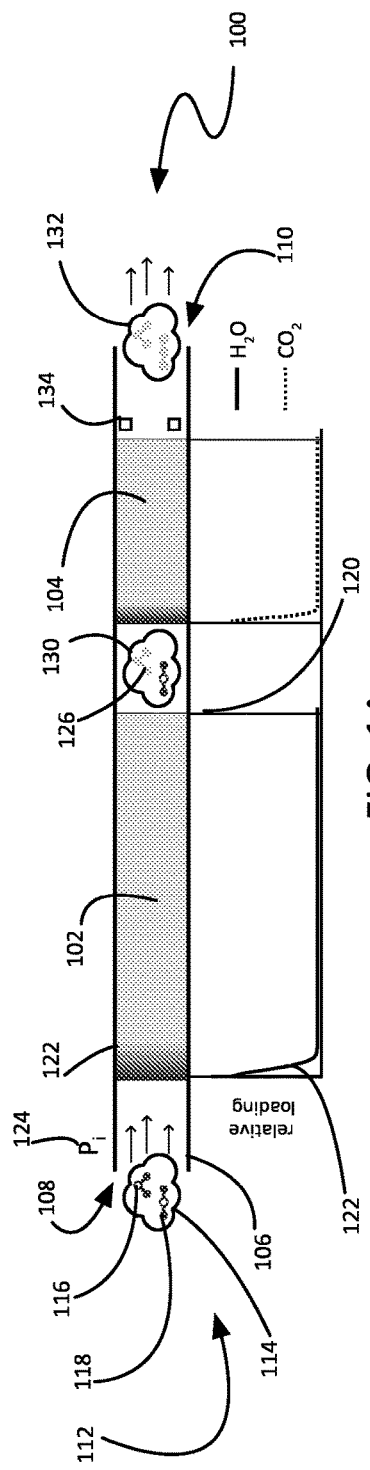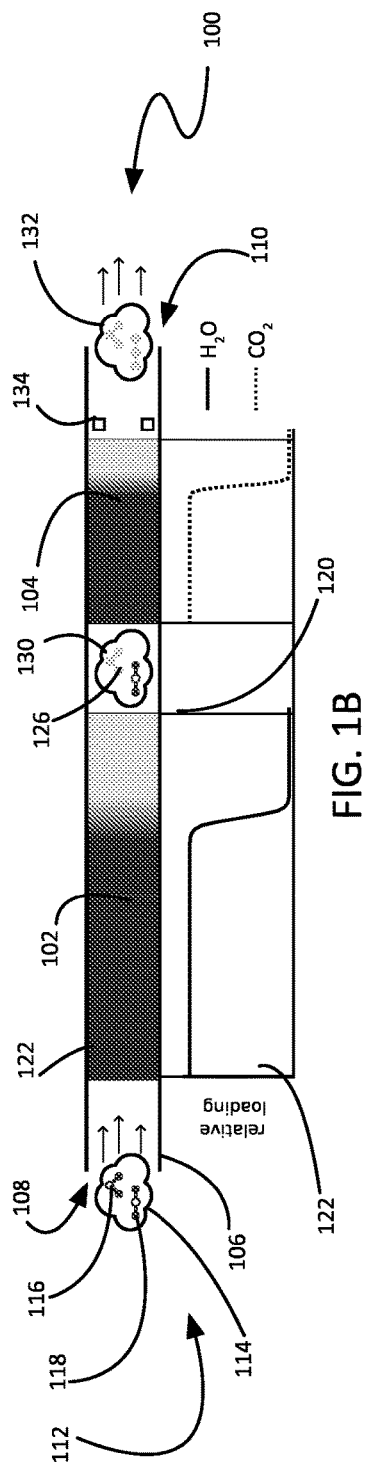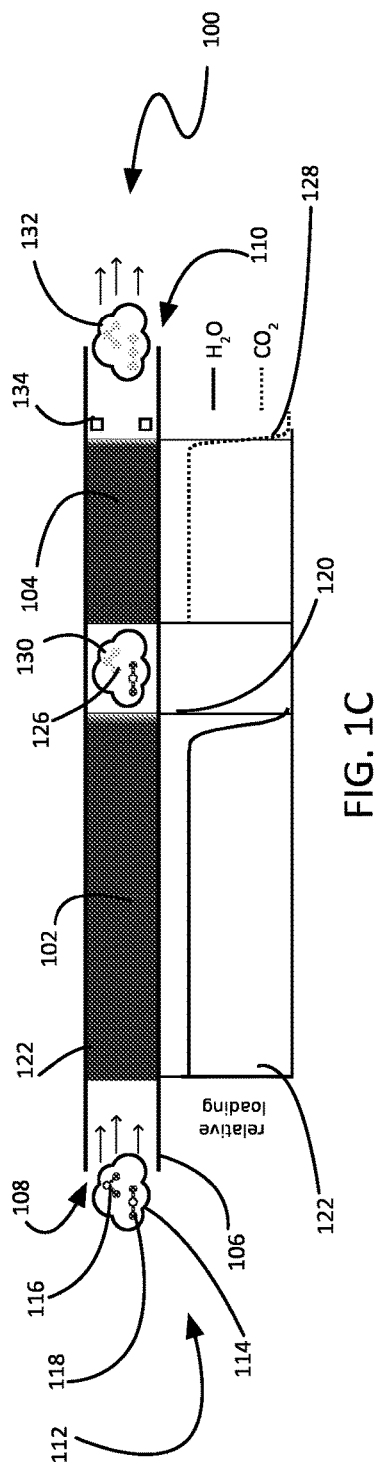
FIG. 1A
FIG. 1B
FIG. 1C

DEVICE, SYSTEM, AND METHOD FOR CARBON DIOXIDE CAPTURE IN HUMID CONDITIONS

RELATED APPLICATIONS

This application is the U.S. National Stage of International Patent Application No. PCT/US2021/062492, filed Dec. 8, 2021, which claims the benefit of and priority to U.S. provisional patent application No. 63/123,219, filed Dec. 9, 2020, titled "System and Method for Energy-Efficient Carbon Dioxide Capture," the contents of each of which are hereby incorporated by reference in their entireties.

TECHNICAL FIELD

Aspects of this document relate generally to carbon dioxide capture.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. The efficient capture and isolation of a useful product stream is crucial to widespread adoption of new carbon capture technologies.

Moisture-swing absorption ("MSA") processes for capturing carbon dioxide require water or water vapor as a driving force mechanism for desorption of $CO_2$, and dry vapor for completing the regeneration of the sorbent. In some direct air capture ("DAC") schemes employing an MSA cycle, the dry vapor is provided by ambient air delivered passively by the wind. However, this constrains the geographic setting to regions with low relative humidity. In regions with higher ambient humidity, it is advantageous to remove the water from the feed air prior to $CO_2$ absorption, and then use that removed water in the subsequent regeneration step. However, the ratio of water removal to $CO_2$ recovery is very high, and the energy for water removal and system regeneration is very large. Additionally, when placed in ideal arid climates, these MSA DAC schemes typically require substantial amounts of water for the regeneration.

SUMMARY

According to one aspect, a device for carbon dioxide capture including a desiccant, a $CO_2$ sorbent material, and a vessel enclosing the desiccant and the $CO_2$ sorbent material, the vessel having a vapor intake and a product outlet. The device is configured to cycle between a first phase, a second phase, and a third phase. The first phase includes a process vapor having water vapor and carbon dioxide gas being received into the vessel through the vapor intake at an intake pressure. The process vapor passes through the desiccant and the $CO_2$ sorbent material, the desiccant absorbing at least a portion of the water vapor in the process vapor resulting in a dry vapor. The $CO_2$ sorbent material absorbs carbon dioxide from the dry vapor resulting in a $CO_2$-lean dry vapor. The portion of the water vapor absorbed by the desiccant is large enough that the $CO_2$ sorbent material absorbs carbon dioxide from the dry vapor uninhibited by the remaining water. The second phase includes the vapor intake being closed and at least one of a first pressure downstream from the desiccant being reduced below the intake pressure and a temperature of the desiccant being increased, resulting in the desorption of water from the desiccant and the desorption of carbon dioxide from the $CO_2$ sorbent material in response to the water desorbed from the desiccant being in direct contact with the $CO_2$ sorbent material. The second phase further having a $CO_2$-rich product stream being removed through the product outlet. The third phase includes a remaining water being desorbed from both the desiccant and the $CO_2$ sorbent material as recovered water.

Particular embodiments may comprise one or more of the following features. The device may include a $CO_2$ concentration sensor inside the vessel, downstream from the $CO_2$ sorbent material in the direction of the process vapor. The device may include a water concentration sensor inside the vessel, downstream from the $CO_2$ sorbent material in the direction of the process vapor. The device may be configured to transition from the first phase to the second phase in response to an increase in the $CO_2$ concentration downstream from the $CO_2$ sorbent material. The device may be configured to transition from the second phase to the third phase in response to an increase in the water concentration downstream from the $CO_2$ sorbent material. The desiccant and the $CO_2$ sorbent material may be each contained within at least one bed within the vessel. The sorption and desorption of at least one of water and carbon dioxide within each of the at least one bed may progress downstream as a moving mass transfer front during each phase. The desiccant and the $CO_2$ sorbent material may be in the same bed. The desiccant and the $CO_2$ sorbent material may be comingled and may be one of mixed homogeneously and mixed to gradually change from substantially desiccant to substantially $CO_2$ sorbent material across the bed. The desiccant and the $CO_2$ sorbent material may be in separate beds. The intake pressure may be proximate atmospheric pressure. The device may include a first vacuum compressor coupled to the vessel downstream from the $CO_2$ sorbent material. The first pressure downstream of the desiccant may be established and maintained by the first vacuum compressor. The device may include a liquid pump configured to place the water desorbed from the desiccant in the second phase in direct contact with the $CO_2$ sorbent material. The desiccant and the $CO_2$ sorbent material may be the same.

According to another aspect of the disclosure, a method for carbon dioxide capture includes receiving a process vapor into a vessel through a vapor intake at an intake pressure, the process vapor including water vapor and carbon dioxide gas, the vessel having a desiccant and a $CO_2$ sorbent material. The method also includes passing the process vapor through the desiccant and the $CO_2$ sorbent material, the desiccant absorbing at least a portion of the water vapor in the process vapor resulting in a dry vapor, the $CO_2$ sorbent material absorbing carbon dioxide from the dry vapor resulting in a $CO_2$-lean dry vapor, the portion of the water vapor absorbed by the desiccant being large enough that the $CO_2$ sorbent material absorbs carbon dioxide from the dry vapor uninhibited by the remaining water. The method includes discontinuing the process vapor by closing the vapor intake, and desorbing the water from the desiccant by at least one of reducing a first pressure downstream from the desiccant to below the intake pressure and increasing a temperature of the desiccant. The method includes desorbing the carbon dioxide from the $CO_2$ sorbent material by placing the water desorbed from the desiccant in direct contact with the $CO_2$ sorbent material, removing the desorbed carbon dioxide through the product outlet as a product stream, and desorbing a remaining water from the desiccant and the $CO_2$ sorbent material.

Particular embodiments may comprise one or more of the following features. The vapor intake may be closed, discontinuing the process vapor, in response to a $CO_2$ sensor within the vessel observing an increase in the $CO_2$ concentration downstream from the $CO_2$ sorbent material. The vapor intake may be closed, discontinuing the process vapor, in response to a water sensor within the vessel observing an increase in the $CO_2$ concentration downstream from the $CO_2$ sorbent material. The desiccant and the $CO_2$ sorbent material may be each contained within at least one bed within the vessel. The sorption and desorption of at least one of water and carbon dioxide within each of the at least one bed may progress downstream as a moving mass transfer front during each phase. The desiccant and the $CO_2$ sorbent material may be in the same bed. The desiccant and the $CO_2$ sorbent material may be comingled and may be one of mixed homogeneously and mixed to gradually change from substantially desiccant to substantially $CO_2$ sorbent material across the bed. The desiccant and the $CO_2$ sorbent material may be in separate beds. The intake pressure may be proximate atmospheric pressure. The first pressure downstream of the desiccant may be reduced to below the intake pressure using a first vacuum compressor coupled to the vessel downstream from the $CO_2$ sorbent material. The water desorbed from the desiccant may be placed in direct contact with the $CO_2$ sorbent material using a liquid pump.

According to yet another aspect of the disclosure, a system for carbon dioxide capture includes a plurality of $CO_2$ capture devices, each device having a desiccant, a $CO_2$ sorbent material, and a vessel enclosing the desiccant and the $CO_2$ sorbent material, the vessel having a vapor intake and a product outlet. The device is configured to cycle between a first phase, a second phase, and a third phase. The first phase includes a process vapor having water vapor and carbon dioxide gas being received into the vessel through the vapor intake at an intake pressure, the process vapor passing through the desiccant and the $CO_2$ sorbent material, the desiccant absorbing at least a portion of the water vapor in the process vapor resulting in a dry vapor, the $CO_2$ sorbent material absorbing carbon dioxide from the dry vapor resulting in a $CO_2$-lean dry vapor, the portion of the water vapor absorbed by the desiccant being large enough that the $CO_2$ sorbent material absorbs carbon dioxide from the dry vapor uninhibited by the remaining water. The second phase includes the vapor intake being closed and at least one of a first pressure downstream from the desiccant being reduced below the intake pressure and a temperature of the desiccant being increased, resulting in the desorption of water from the desiccant and the desorption of carbon dioxide from the $CO_2$ sorbent material in response to the water desorbed from the desiccant being in direct contact with the $CO_2$ sorbent material, the second phase further having a $CO_2$-rich product stream being removed through the product outlet. The third phase includes a remaining water being desorbed from both the desiccant and the $CO_2$ sorbent material as recovered water.

Particular embodiments may comprise one or more of the following features. Each $CO_2$ capture device may also include a $CO_2$ concentration sensor inside the vessel, downstream from the $CO_2$ sorbent material in the direction of the process vapor, and/or a water concentration sensor inside the vessel, downstream from the $CO_2$ sorbent material in the direction of the process vapor. Each device of the plurality of devices may be configured to transition from the first phase to the second phase in response to an increase in the $CO_2$ concentration downstream from the $CO_2$ sorbent material. Each device of the plurality of devices may be configured to transition from the second phase to the third phase in response to an increase in the water concentration downstream from the $CO_2$ sorbent material. For each $CO_2$ capture device of the plurality of $CO_2$ capture devices, the desiccant and the $CO_2$ sorbent material may be each contained within at least one bed within the vessel of that device. The sorption and desorption of at least one of water and carbon dioxide within each of the at least one bed of that device may progress downstream as a moving mass transfer front during each phase. For each $CO_2$ capture device of the plurality of $CO_2$ capture devices, the desiccant and the $CO_2$ sorbent material may be in the same bed. For each $CO_2$ capture device of the plurality of $CO_2$ capture devices, the desiccant and the $CO_2$ sorbent material may be in separate beds. For each $CO_2$ capture device of the plurality of $CO_2$ capture devices, the intake pressure may be proximate atmospheric pressure. Each $CO_2$ capture device of the plurality of $CO_2$ capture devices may further include a first vacuum compressor coupled to the vessel downstream from the $CO_2$ sorbent material. The first pressure may be established and maintained by the first vacuum compressor. Each $CO_2$ capture device of the plurality of $CO_2$ capture devices may further include a liquid pump configured to place the water desorbed from the desiccant in the second phase in direct contact with the $CO_2$ sorbent material. The system may also include a plurality of device pairs composed of the plurality of $CO_2$ capture devices, each device pair having a first device and a second device. The system may also include a plurality of heat transfer circuits, each heat transfer circuit having a heat transfer fluid circulating in a fluidic loop via a pump, each heat transfer circuit coupled to a different device pair such that the heat transfer circuit may be in thermal contact with the desiccant of the first device and the second device. The first device and the second device may be out of phase such that, when the first device may be in the first phase, the second device may be in either the second phase or the third phase. Each heat transfer circuit may be configured to transfer heat between the devices in the device pair such that the heat transfer fluid may be indirectly heated by the desiccant of the device in the first phase and cooled as it transfers heat to the desiccant of the device in the second phase or third phase. The system may further include a plurality of device pairs composed of the plurality of $CO_2$ capture devices, each device pair having a first device and a second device. The system may also include a plurality of heat pumps, each heat pump having a heat transfer fluid circulating in a fluidic loop having a compressor and a pressure letdown, each heat pump coupled to a different device pair such that the heat pump may be in thermal contact with the desiccant of the first device and the second device. The first device and the second device may be out of phase such that, when the first device may be in the first phase, the second device may be in either the second phase or the third phase. Each heat pump may be configured to transfer heat from a lower temperature in the desiccant of the device in the first phase to a higher temperature in the desiccant of the device in the second phase or the third phase. The system may also include a plurality of device triads composed of the plurality of $CO_2$ capture devices. Each device triad may include a first device in the first phase, a second device in the second phase, and a third device in the third phase. Each device triad may include a heat pump having a heat transfer fluid circulating in a fluidic loop, the fluidic loop having a compressor and a pressure letdown, the heat pump coupled to the device triad such that the heat pump may be in thermal contact with the desiccants of the three devices of the device triad, the heat pump configured to transfer heat from the first device in the first phase to the second device in the second phase and the third device in the third phase. Each device triad may include a second vacuum compressor coupled to the product outlet of the second device and configured to compress the $CO_2$-rich product stream of the second device. Each device triad may include a third vacuum compressor coupled to the product outlet of the third device and configured to compress the water vapor of the third device. Each device triad may include a first heat transfer circuit in fluidic communication with the product outlet of the third device and configured to add, via a first heat exchanger, a heat of compression from the second and third vacuum compressors to the fluidic loop of the heat pump in thermal contact with the desiccant of the second device and the third device. Each device triad may include a second heat transfer circuit in fluidic communication with a cooling tower coupled to the first device and configured to remove, via a second heat exchanger, a heat of revaporization from the revaporization of water from the second device into the $CO_2$-lean dry vapor of the first device, the heat of revaporization being removed from the fluidic loop of the heat pump.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 1A, 1B, and 1C are schematic views of a $CO_2$ capture device at various points within a first phase;

DETAILED DESCRIPTION

Figure 2:
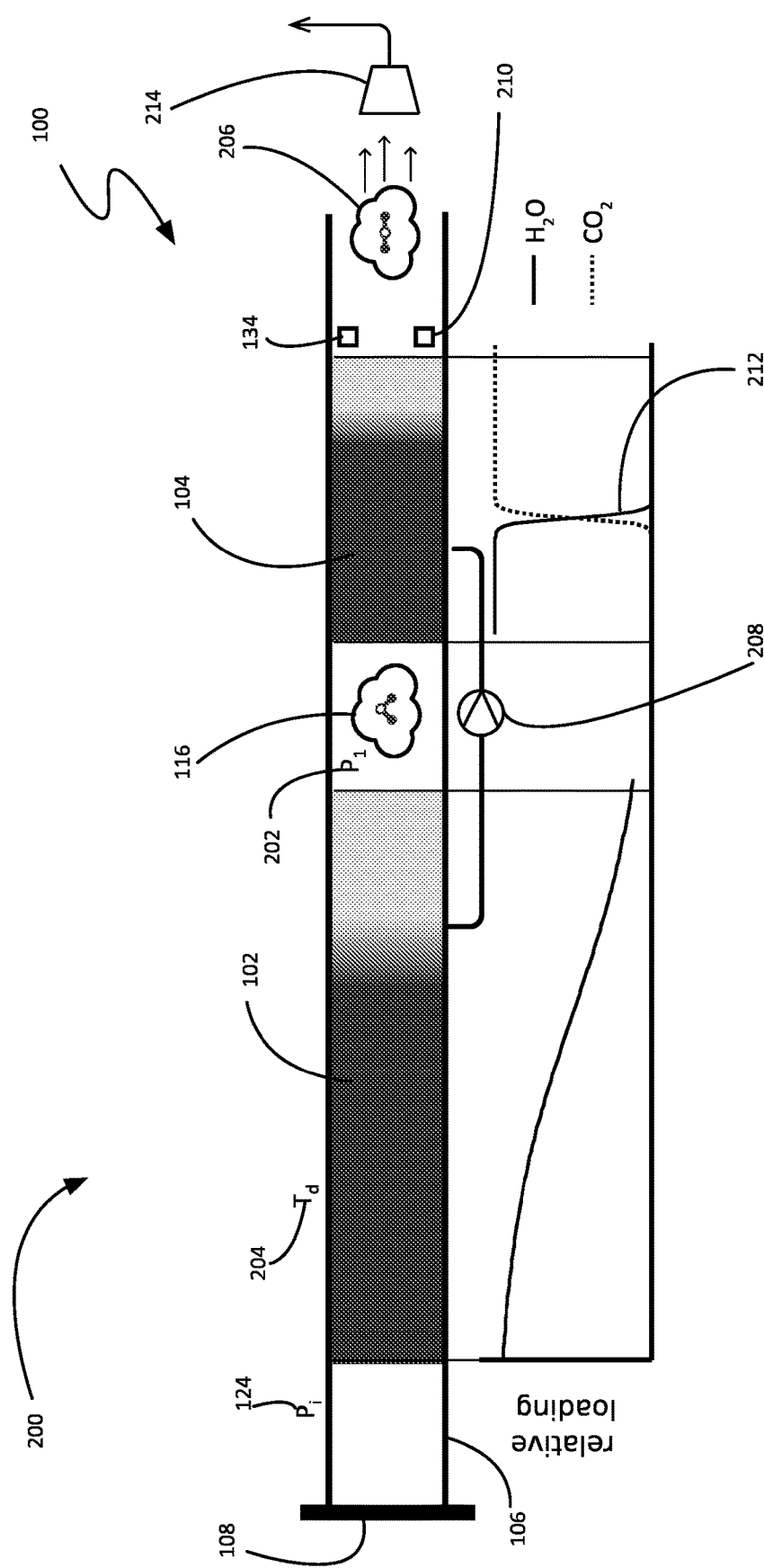
FIG. 2 is a schematic view of the $CO_2$ capture device in a second phase

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. The efficient capture and isolation of a useful product stream is crucial to widespread adoption of new carbon capture technologies.

Moisture-swing absorption ("MSA") processes for capturing carbon dioxide require water or water vapor as a driving force mechanism for desorption of $CO_2$, and dry vapor for regeneration of the sorbent. In some direct air capture ("DAC") schemes employing an MSA cycle, the dry vapor is provided by ambient air delivered passively by the wind. However, this constrains the geographic setting to regions with low relative humidity. In regions with higher ambient humidity, it is advantageous to remove the water from the feed air prior to $CO_2$ absorption, and then use that removed water in the subsequent regeneration step. However, the ratio of water removal to $CO_2$ recovery is very high, and the energy for water removal and system regeneration is very large. Additionally, when placed in ideal arid climates, these MSA DAC schemes typically require substantial amounts of water for the regeneration.

Contemplated herein are devices, systems, and methods for capturing carbon dioxide from humid air using moisture-swing absorption. As will be discussed below, the contemplated systems, devices, and methods center around the removal of water from the fluid being processed, and the subsequent use of that water to release the captured carbon dioxide from the moisture-swing sorbent materials. This manipulation of energy and water is performed in an efficient manner, through strategic heat transfer and the recovery of energy and resources that would otherwise be lost in a conventional system. The contemplated systems, devices, and methods may be adapted for DAC in any region, including those that are arid, where a clean, reliable and inexpensive source of water is not available. In addition, these methods may be applicable to $CO_2$ recovery from any process vapor stream containing $CO_2$ and moisture, such as flue gas.

In operation, a process vapor containing water and $CO_2$ is first passed over a desiccant which substantially adsorbs water and substantially reduces the water content of the vapor. The dry vapor then is passed over a solid sorbent which captures $CO_2$. In a second step, the vapor feed flow is discontinued and water is desorbed from the desiccant by reducing the system pressure or increasing the temperature or both. The desorbed water vapor is extracted from the desiccant and then put into direct contact with the $CO_2$-containing sorbent, on which it is preferentially absorbed, causing $CO_2$ to be desorbed and then removed from the system. In a third step, any remaining water is desorbed from the desiccant and $CO_2$ sorbent, and removed from the system. These steps may be performed on multiple units operating with asynchronous phase changes. Heat may be advantageously and strategically transferred between devices within the system. For example, in some embodiments, heat generated during water adsorption is recovered and is transferred to provide heat addition during water desorption. Additional heat associated with compression may be removed from compressed water vapor recovered during the third step, and then applied to provide additional heat during water desorption. In some embodiments, dry, $CO_2$-lean process vapor from the first step is combined with water vapor from the third step resulting in evaporative cooling which can be applied to provide additional heat removal from the first phase.

FIGS. 1A, 1B, and 1C are schematic views of a non-limiting example of a $CO_2$ capture device 100. Specifically, it is three schematic views of the device 100 in a first phase 112, at three different loading levels. As shown, the $CO_2$ capture device 100 (hereinafter "$CO_2$ capture device 100", "capture device 100", or simply "device 100") comprises a $CO_2$ sorbent material 104 and a desiccant 102, both enclosed within a vessel 106 that has a vapor intake 108 (i.e., a valve or other dynamic opening through which a gas/vapor may pass) at one end, and a product outlet 110 (i.e., a valve or other dynamic opening through which a product stream may be received from the device 100 for use or further processing).

The processes contemplated herein use a solid capture material for carbon dioxide 118 and a solid capture material for water vapor 116. According to various embodiments, the $CO_2$ capture material operates on a moisture-swing cycle, capturing $CO_2$ in a relatively low humidity atmosphere and releasing $CO_2$ in a relatively high humidity atmosphere. This material may comprise a physical adsorbent such as a molecular sieve, or a solid chemical absorbent such as ion exchange resin. It should have the property of capturing either $CO_2$ 118 or water vapor 116 from its surrounding atmosphere, with a selective preference for water at the prevailing concentrations of the process such that the absorption of water prompts the desorption of $CO_2$. In the context of the present description and the claims that follow, this material will be referred to as "$CO_2$ sorbent material 104" or "moisture-swing sorbent 104". It should be noted, however, that the systems, methods, and devices contemplated herein may be adapted for use with other types of $CO_2$ sorbent material 104, or moisture-swing sorbents that also benefit from another type of swing (e.g., electricity, heat, pressure, etc.).

The water capture material selectively captures water vapor 116, by physical adsorption, capillary condensation or weak chemical absorption. It should have the features of a high water-loading capacity, and water sorption must be reversible, by pressure-swing, temperature-swing, or a combination of both. Here, this material will generally be referred to as the "desiccant 102." The desiccant 102 may be a silica gel or zeolite, according to various embodiments. In some cases, the desiccant 102 material may also be the moisture-swing $CO_2$ sorbent material 104.

The process and its variations comprise 3 main steps or phases: first, $CO_2$ Capture; second, $CO_2$ Recovery; and third, Water Recovery. Each phase will be discussed in turn. The devices 100 contemplated herein are configured to cycle between the first phase, the second phase, and the third phase, according to various embodiments.

FIGS. 1A-1C shows conceptual representations of the first phase 112, including the loading levels of water and $CO_2$ across the desiccant 102 and $CO_2$ sorbent material 104, respectively, as $CO_2$ capture proceeds. A process vapor stream 114 containing carbon dioxide gas 118 and water vapor 116 is received through the vapor intake 108 at an intake pressure 124. In some embodiments, the device 100 may be a passive system, receiving the process vapor stream 114 through natural air currents. In other embodiments, the device 100 may receive the process vapor stream 114 through forced gas transport (e.g., forced convection, use of blowers or pumps, etc.).

According to various embodiments, the process vapor 114 is first exposed to the desiccant 102 to remove some portion 126 of water 116, and subsequently exposed to the moisture-swing sorbent 104 to remove some portion of the $CO_2$ 118. Water capture on the desiccant 102 should be accomplished to the extent that the remaining water vapor concentration does not inhibit $CO_2$ capture on the $CO_2$ sorbent material 104. The vapor leaving the desiccant 102 is substantially depleted of water; the vapor leaving the $CO_2$ sorbent material 104 is substantially depleted of both water and $CO_2$.

In the case of DAC devices, in which the process vapor stream 114 is ambient air, the amount of water captured may be substantially greater than the amount of $CO_2$ captured. Therefore, in some embodiments, the mass of desiccant 102, together with its capacity for water, must be proportionately larger than that of the $CO_2$ sorbent material 104 for $CO_2$. The $CO_2$ capture step is dynamic—as it proceeds, the loading of water on the desiccant 102 and $CO_2$ on the $CO_2$ sorbent material 104 both increase with time.

The desiccant 102 and the $CO_2$ sorbent material 104 are both held inside one or more beds 120. Ideally, these "beds" 120 are configured such that equilibrium loading for both water 116 and carbon dioxide 118 are approached at a sharp, moving mass transfer front 122 proceeding through the beds 120 from upstream to downstream (i.e., in the direction of the process vapor flow).

In the context of the present description and the claims that follow, a bed 120 is a structure configured to contain the capture materials (i.e., desiccant 102, sorbent 104, etc.) and permit a fluid to flow through, or otherwise be exposed to, Said materials. The geometries available, and best suited for the intended purpose, will vary depending on the nature of the capture materials being used, their various physical and chemical properties, as well as the nature of the process vapor 114.

According to various embodiments, the desiccant 102 and $CO_2$ sorbent material 104 are contained in beds 120, such as in a conventional, packed bed. In some embodiments, the desiccant 102 and the $CO_2$ sorbent material 104 may be contained in separate beds 120 in a device. In other embodiments, the desiccant 102 and the $CO_2$ sorbent material 104 may be contained within the same bed 120.

In embodiments where the desiccant 102 and the $CO_2$ sorbent material 104 are contained within the same bed 120, in some embodiments, the $CO_2$ sorbent material 104 and the desiccant 102 are comingled, and mixed homogeneously. In other embodiments, the comingled $CO_2$ sorbent material 104 and descant 102 may be mixed to create a gradient, with pure $CO_2$ sorbent material 104 at one end of the bed 120 and pure desiccant 102 at the other. In other words, the desiccant 102 and the $CO_2$ sorbent material 104 are mixed to gradually change from substantially desiccant 102 to substantially $CO_2$ sorbent material 104 across the bed 120, according to some embodiments. In still other embodiments, the $CO_2$ sorbent material 104 and the desiccant 102 may be the same material.

The total mass of desiccant 102 and $CO_2$ sorbent material 104 will be larger than a conventional moisture-swing cycle. For example, in the case of DAC capture, the amount of desiccant 102 will be much greater than $CO_2$ sorbent material 104. This may make it impractical to configure these beds 120 such that they can be mechanically moved and exposed directly to natural wind convection. If the beds 120 are maintained in a stationary position, it may be preferable and necessary to use forced convection to deliver the process vapor 114. The "beds" of desiccant 102 and $CO_2$ sorbent material 104 may be arranged in a manner which provides even flow distribution perpendicular to the flow direction, a plug flow velocity profile, a sharp mass transfer front 122 and accommodation of indirect heat exchange with a circulating heat transfer fluid (to be discussed further, below).

A conventional packed bed comprising spherical or cylindrical pellets is one means for containing these materials. A packed bed imposes a pressure drop which is related to flow velocity, bed void fraction and pellet shape. For typical low-pressure adsorption processes, this pressure drop can be on the order of 1-3 kPa per m of travel distance through the bed. In DAC applications, a large of amount of air must be processed to recover $CO_2$. If forced convection is required to overcome packed bed pressure drop, then the energy requirement per unit $CO_2$ can be very large.

As a specific, non-limiting example, an air blower providing 1 kPa pressure increase at 70% efficiency, would consume 86 kJ/mol contained $CO_2$. This pressure drop requirement of ≥1 kPa would also eliminate most creative options for use of natural air convection. For DAC, a total pressure drop, including inlet and outlet resistances, will preferably be maintained <0.5 kPa, and ideally <0.1 kPa. This is not readily available with conventionally packed beds.

Structured packing can provide high performance mass transfer and much lower pressure drop relative to packed beds. Applied to DAC, structured packing could enable the use of air blowers to deliver air. Structured packing comes in many forms. It can be manufactured as an extruded monolith, laminate, fabric or foam. Laminates or fabrics can be in flat or spiral wound arrangements. Structured packing can also be fabricated using support material and design which enhances thermal conductivity. This will be advantageous for integrating heat transfer with a circulating fluid.

According to various embodiments, there are several alternative arrangements within the beds, including Sequential layered beds (e.g., desiccant 102 is layered ahead of $CO_2$ sorbent material 104 using packed or structured materials), Uniform mixed materials (e.g., desiccant 102 and $CO_2$ sorbent material 104 are mixed uniformly throughout a single bed. While undergoing phase one and phase two, the adsorbed waterfront progresses through the bed 120 pushing the absorbed $CO_2$ front ahead of it.), and Gradient mixed materials (e.g., as a variation on uniform mixed materials, desiccant 102 and $CO_2$ sorbent material 104 may be mixed with a progressive composition change along the bed 120, such as a decreasing composition of desiccant 102 and increasing composition of $CO_2$ sorbent material 104 in the direction of process vapor flow).

According to various embodiments, this first $CO_2$ capture phase concludes when the sorbent material bed 104 is substantially loaded and the $CO_2$ mass transfer front is approaching or has already begun "breakthrough", in which the $CO_2$ concentration in the exiting vapor stream begins to increase. In some embodiments, the device 100 may comprise a $CO_2$ concentration sensor 134 inside the vessel 106, downstream from the $CO_2$ sorbent material 104, in the direction of the process vapor 114. The device 100 may be configured to transition from the first phase 112 to the second phase, in response to an increase 128 in the $CO_2$ concentration downstream from the $CO_2$ sorbent material 104. Such an increase would indicate that the $CO_2$ sorbent material 104 is no longer able to absorb the carbon dioxide in the dry vapor 130 coming from the desiccant 102 and passing through, so the $CO_2$-lean dry vapor 132 would start increasing in $CO_2$ concentration until the second phase begins.

As previously discussed, the $CO_2$ sorbent material 104 absorbs carbon dioxide 118 from the dry vapor 130, resulting in a $CO_2$-lean dry vapor 132. According to various embodiments, the portion of the water vapor 126 absorbed by the desiccant 102 should be large enough that the $CO_2$ sorbent material 104 absorbs carbon dioxide 118 from the dry vapor 130 in a manner uninhibited by the remaining water.

FIG. 2 is a schematic view of a non-limiting example of a $CO_2$ capture device in a second phase 200. According to various embodiments, $CO_2$ recovery is affected by exposing the $CO_2$-laden $CO_2$ sorbent material 104 to water vapor 116. This could occur if the operation occurring in phase one 112 is simply allowed to continue such that once the desiccant 102 approaches its equilibrium loading, the water vapor 116 present in the process vapor 114 will break through the desiccant bed 102 and continue to the sorbent material bed 104.

In other embodiments, this transition into the second phase 200 begins with the device 100 discontinuing the addition of process vapor 114 to the device 100 and closing the vapor intake 108, then induce a first pressure 202 at or near the product outlet 110 (or at least downstream from the desiccant 102), the first pressure 202 being lower than the original intake pressure 124, creating a differential that promotes continued movement downstream.

If the intake pressure 124 had been near atmospheric pressure (e.g., in a DAC device, etc.), the outlet pressure would then be subjected to vacuum. Vacuum may be necessary in any event to provide for the appropriate partial pressures of water and $CO_2$ for a given operating temperature during desorption. Some embodiments may comprise a first vacuum compressor 214 coupled to the vessel 106 downstream from the $CO_2$ sorbent material 104 such that it may be used to establish and maintain the first pressure 202. When the pressure in the desiccant 102 is lowered, water desorbs and proceeds to the sorbent material bed 104 where it is absorbed.

In some embodiments, the position of the $CO_2$ sorbent material 104 relative to the desiccant 102 may result in the desorbed water 116 making direct contact with the $CO_2$ sorbent material 104 after being released from the desiccant 102. In other embodiments, though, the recently freed water may need to be transported to the $CO_2$ sorbent material 104 to make direct contact and cause the release of carbon dioxide. For example, in some embodiments, the device 100 may further comprise a liquid pump 208 in fluidic communication with the $CO_2$ sorbent material 104 and the desiccant 102 such that the liquid pump 208 can place the water 116 desorbed from the desiccant 102 in the second phase 200 into direct contact with the $CO_2$ sorbent material 104.

This causes carbon dioxide gas 116 to be desorbed from the $CO_2$ sorbent material 104 and concentrated in the product outlet 110. According to various embodiments, the $CO_2$-rich product stream 206 will be significantly concentrated. In fact, in some embodiments, the $CO_2$-rich product stream 206 can be essentially pure if the process vapor 114 contained in the free volume of the device 100 is evacuated at the onset of phase two 200, and the water vapor 116 mass transfer moving through the sorbent material bed is sharp.

The desorption of water 116 from the desiccant bed 102 may also be accomplished or further enhanced by a temperature swing, by itself or in conjunction with pressure-swing. For example, in some embodiments, the temperature 204 of the desiccant 102 may be increased to facilitate the release of water. The manipulation of the desiccant temperature will be discussed in greater detail with respect to the energy management of a contemplated system 400 that is made up of a plurality of the contemplated devices 100.

FIG. 2 shows the relative loading levels of the desiccant 102 and $CO_2$ sorbent material 104 beds as the second phase 200 proceeds. $CO_2$ recovery is concluded when the $CO_2$ has been substantially desorbed from the $CO_2$ sorbent material 104. At this time the $CO_2$ sorbent material 104 is loaded with water 116.

All of this will result in the desorption of water 116 from the desiccant 102 and the desorption of carbon dioxide 118 from the $CO_2$ sorbent material 104 in response to the water desorbed from the desiccant 102 being in direct contact with the $CO_2$ sorbent material 104. Finally, the second phase 200 includes a $CO_2$-rich product stream 206 being removed through the product outlet 110.

According to various embodiments, this second phase 200, the $CO_2$ recovery phase, concludes when the sorbent material bed 104 is substantially empty of carbon dioxide and the water mass transfer front is approaching or has already begun "breakthrough", in which the water concentration in the exiting vapor stream begins to increase. In some embodiments, the device 100 may comprise a water concentration sensor 210 inside the vessel 106, downstream from the $CO_2$ sorbent material 104, in the direction of the process vapor 114. The device 100 may be configured to transition from the second phase 200 to the third phase 300, in response to an increase 128 in the water concentration downstream from the $CO_2$ sorbent material 104. Such an increase would indicate that the $CO_2$ sorbent material 104 is no longer able to absorb the water coming from the desiccant 102 and passing through, so the $CO_2$-lean dry vapor 132 would start increasing in water concentration until the third phase begins.

Figure 3:
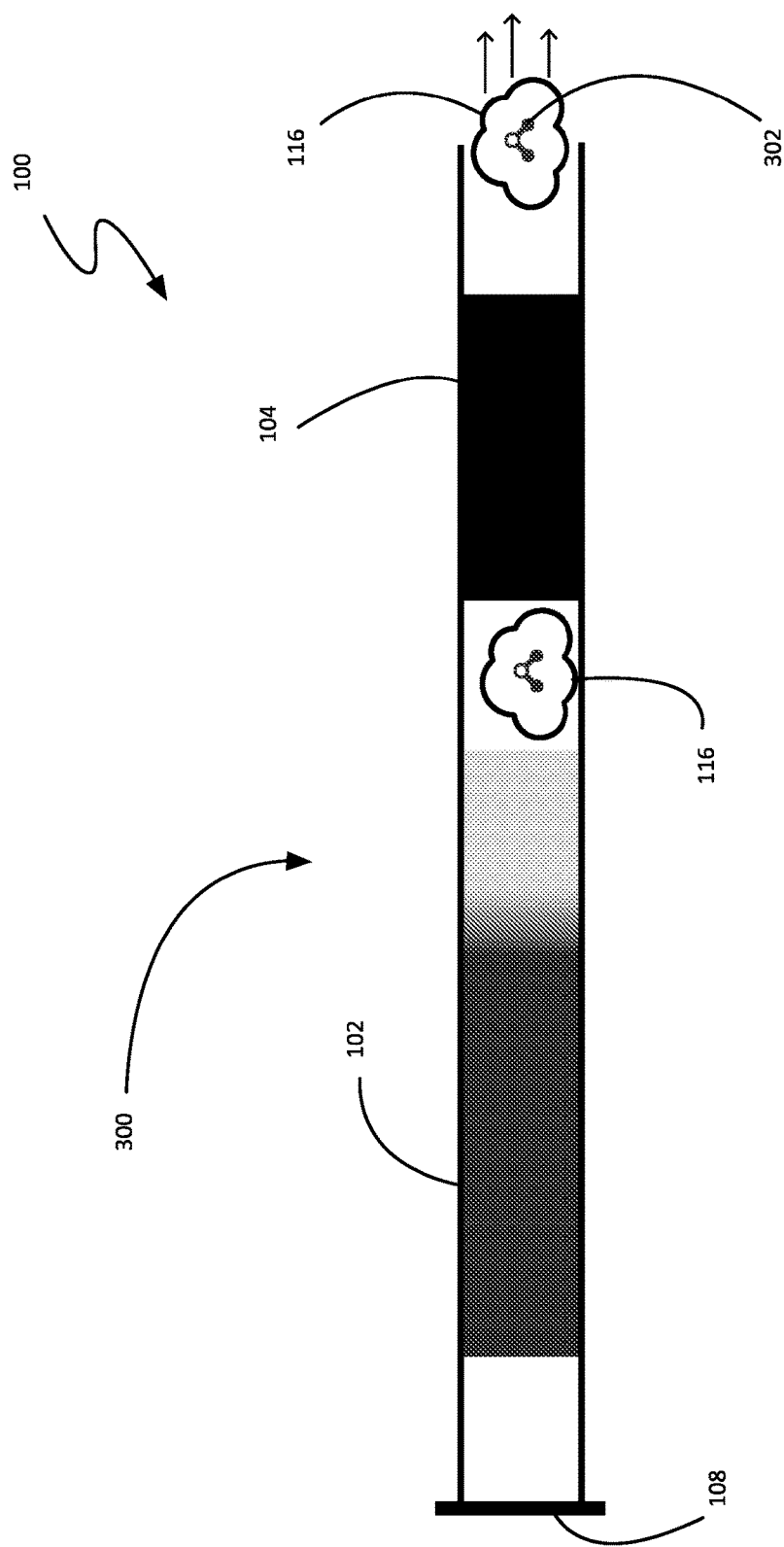
FIG. 3 is a schematic view of the $CO_2$ capture device in a third phase.

FIG. 3 is a schematic view of a non-limiting example of a $CO_2$ capture device in a third phase 300. For cyclic operation, remaining water 302 (i.e., water still within the capture materials after the second phase 200) is removed from the desiccant 102 and $CO_2$ sorbent material 104 to return them to their initial states (i.e., their state at the beginning of phase one 112). The non-limiting example described here will be for applications in which the $H_2O$:$CO_2$ concentration in the process vapor 114 is much greater than the $H_2O$:$CO_2$ equilibrium concentrations at their maximum loading on the moisture-swing sorbent 104, as they will be for DAC. There is an alternate embodiment in which $H_2O$:$CO_2$ concentration is lower than the $CO_2$ sorbent material 104 maximum loading ratio, for example in a power-plant flue gas capture application. For this specific embodiment, water can be added to the device 100 to accomplish the $CO_2$ desorption in phase two 200. In this embodiment, water can be recovered so that there is little or no additional device water requirements.

In other embodiments, including embodiments configured for DAC operation, water 116 must be removed from both the desiccant 102 and $CO_2$ sorbent material 104 beds. In some embodiments, this removal is performed by continuing the pressure-swing or temperature-swing or combination-swing from phase two 200, with the difference being that the recovered vapor is now largely water vapor 116 rather than $CO_2$ 118, and the discharge is diverted from $CO_2$ product processing to recovered water processing. The water containing discharge vapor is substantially pure. Once compressed, it is available as low-pressure steam or it may be cooled and condensed.

As a specific, non-limiting example, consider an embodiment of the contemplated device 100 adapted for DAC in a humid climate such as Dublin Ireland with an average relative humidity of about 80% and an average temperature of about 10° C. The water mole fraction of this air is approximately 0.01, or 25 times the mole fraction of $CO_2$. (Incidentally, this is about the same mole fraction of water in the air in Tempe Arizona in June at 35° C. and 20% relative humidity). An overall factor in the energy demand of this process is related to the co-production of a dry, $CO_2$-depleted air byproduct in phase one 112 and a pure water vapor 116 (aka steam) byproduct in phase three 300. The minimum thermodynamic work requirement to accomplish the production of these by-products at 0.01 water mole fraction and 10° C. is about 300 kJ/mol $CO_2$. If this energy demand for byproduct separation were to be provided at a very optimistic efficiency of 50% and electric power at $0.10/kWh, the cost would be about $400/tonne $CO_2$.

Related to this byproduct separation, the energy required to desorb the water in phases 2 and 3 may be provided by vacuum compressor work, thermal energy or both, according to various embodiments. For DAC, this energy requirement alone is significant relative to the amount of $CO_2$ that is recovered. For physical adsorption, the heat of adsorption is related to the adsorption isotherm and the cyclic loading level. As a specific, non-limiting example, a silica gel desiccant operating between 10% and 30% mass loading of water exhibits a heat of adsorption on the order of 20 kJ/mol $H_2O$ (about half the heat of vaporization of water). If the heat of adsorption for operating this process cycle were to be provided by external electric energy at $0.10/kWh, this operating cost portion would be over $300/tonne $CO_2$. On the top of that, the water heat of adsorption creates a problematic performance obstacle. During water capture on the desiccant 102 in phase one 112, the heat evolved and associated temperature increase of the process vapor 114 and desiccant 102 reduces the achievable equilibrium loading level. This is further compounded during water desorption in phase 2 and phase 3, as cooling of the desiccant 102 makes water removal more difficult.

The energy demand, operating problems and associated costs for separation of water from air preceding carbon dioxide moisture-swing absorption for direct air capture would seem to be intractable, commercial showstoppers for conventional capture technologies. Contemplated herein is a $CO_2$ capture system that makes use of the devices 100 previously discussed, integrating them together such that they may transfer heat between each other. More specifically, the significant barriers discussed above may be overcome through transferring the heat of adsorption of water between the water capture (i.e., phase 1) and water desorption steps (i.e., phase 2 and phase 3), and recombining water and dry air in a manner which substantially recovers the separation work.

Water adsorption in phase one 112 is exothermic. Water desorption in phases 2 and 3 is endothermic. In an ideal system the net energy change may be small—positive or negative depending on the pressure and temperature differences between the adsorption and desorption steps. If multiple devices 100 are operating in parallel and initiating phase changes at different staged times, some heat generated in a device 100 in phase one 112 can be transferred to provide heat input to other devices 100 that are in phases 2 and 3.

In some embodiments, multiple beds 120 may be arranged in layers, flat or concentric, with alternating layers in fluid connection with separate fluidic feed and discharge channels. These beds 120 are arranged and sequenced such that bed layers operating in phase one 112 and generating heat are adjacent to bed layers in phase 2 or phase 3 and receiving heat. This arrangement would provide intimate contact for indirect heat transfer and enable a minimal temperature difference.

Figure 4:
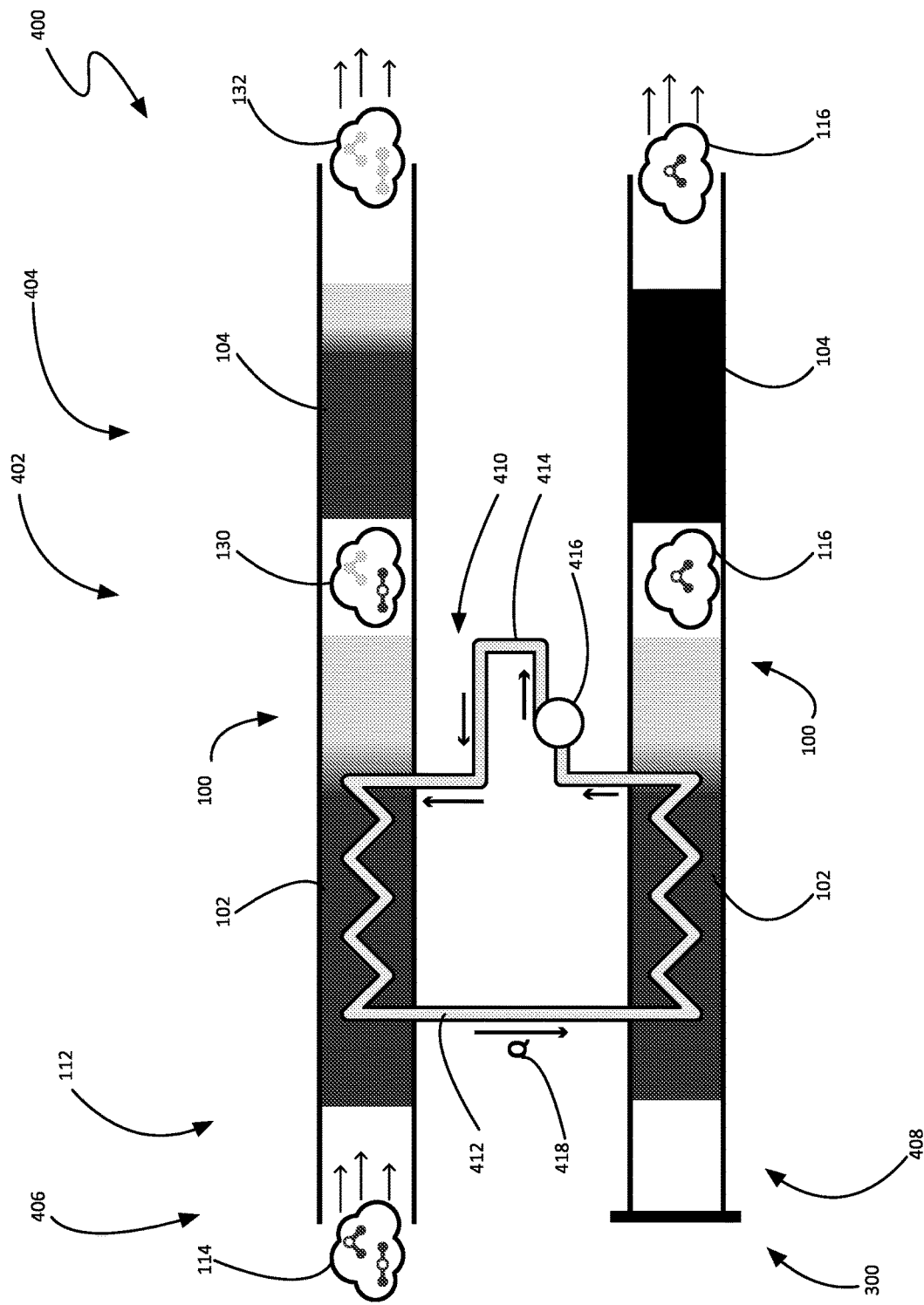
FIG. 4 is a schematic view of a $CO_2$ capture system made of two capture devices linked by a heat transfer circuit.

FIG. 4 is a schematic view of a non-limiting example of a $CO_2$ capture system 400 made of two capture devices 100 linked by a heat transfer circuit 410. According to various embodiments, heat 418 may be transferred by circulating a heat transfer fluid 412 between multiple beds operating out-of-sequence (i.e., having different phases) such that fluid 412 is pumped to a bed 120 operating in phase one 112 and indirectly heated, then circulated to a separate bed 120 operating in phase two 200 or phase three 300, in a continuous loop, as shown in FIG. 4. This may be accomplished as sensible energy change in the heat transfer fluid 412 by a temperature increase and decrease. The temperature difference between the beds 120 will be the additive temperature differences of the fluid 412 with each bed 120.

According to various embodiments, a $CO_2$ capture system 400 (hereinafter "capture system 400" or "system 400") may comprise a plurality of devices 402 organized into a plurality of device pairs 404, each pair 404 having a first device 406 and a second device 408. Within each device pair 404 there is a heat transfer circuit 410 comprising a heat transfer fluid 412 circulating in a fluidic loop 414 via a pump 416. The heat transfer circuit 410 is coupled to both devices in its device pair 404 such that the heat transfer circuit 410 is in thermal contact with the desiccant 102 of the first device 406 and the second device 408. Because these device are out of phase, when the first device 406 is in the first phase 112, the second device 408 is in either the second phase 200 or the third phase 300. The heat transfer circuit 410 is configured to transfer heat 418 between the devices in the device pair 404 such that the heat transfer fluid 412 is indirectly heated by the desiccant 102 of the device 100 in the first phase 112 and cooled as it transfers heat 418 to the desiccant 102 of the device in the second phase 200 or third phase 300.

Other embodiments may make use of a vapor-liquid phase change fluid, such as a refrigerant, which has a high heat of vaporization, high thermal conductivity, and a boiling point temperature near that of the bed operating temperatures at practical circulating loop pressure. The circulating phase change fluid is pumped as liquid to a phase one 112 bed where it evaporates, then flows to a phase two 200 bed or phase three 300 bed where it condenses back to liquid. The circulation rate of the phase change fluid can be much lower than that of a sensible heat transfer fluid 412. Also, condensation and evaporation enhance the heat transfer efficiency thereby reducing heat transfer surface area and/or temperature differences.

Figure 5:
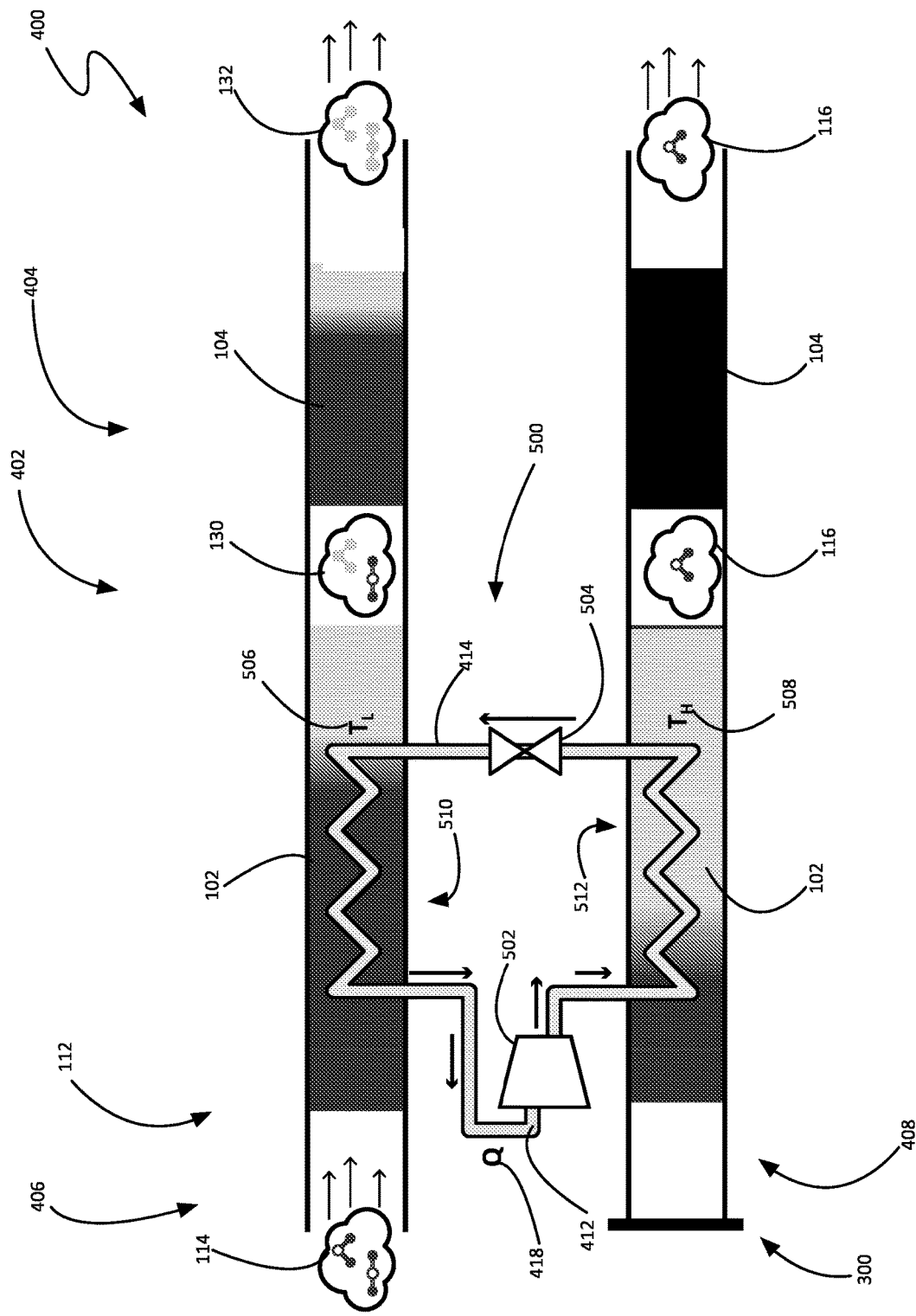
FIG. 5 is a schematic view of a $CO_2$ capture system with capture devices linked by a heat pump.

FIG. 5 is a schematic view of a non-limiting example of a $CO_2$ capture system 400 with capture devices 100 linked by a heat pump 500. Similar to the system 400 shown in FIG. 4, this system 400 comprises a plurality of device pairs 404, each having a first device 406 and second device 408. The devices within a pair are out of phase with each other. According to various embodiments, including the non-limiting example shown in FIG. 5, the heat transfer circuit 410 may be replaced with a heat pump 500.

As shown, the fluidic loop 414 with heat transfer fluid 412 described with respect to the Figure can be modified as shown in FIG. 5 to function as a heat pump 500, moving heat 418 from a lower temperature 506 in a bed in phase one 112 (e.g., desiccant bed) to a higher temperature 508 in a bed in phase two 200 or phase three 300 (e.g., desiccant bed). This is accomplished by incorporating a compressor 502 to increase the pressure of the vapor within the loop 414 from the phase one 112 evaporator 510, and a pressure reduction device (or pressure letdown) 504 to reduce the pressure of the liquid within the loop 414 from the phase two 200 or phase three 300 condenser 512.

The use of a heat pump 500 enables system flexibility for control of the bed temperatures. In one embodiment, the heat pump 500 can provide a small temperature boost to just overcome the heat transfer temperature differences such that all beds are maintained at nearly the same temperature throughout all operating phases. This mode of operation has the advantage that there are no switching efficiency losses due to bed heating and cooling between phases. In another embodiment, the heat pump 500 can provide higher temperatures in a bed in phase two 200 and phase three 300 relative to a phase one 112 bed so that the desiccant 102 beds (and potentially also $CO_2$ sorbent material 104 beds) operate in a temperature-swing cycle in addition to pressure-swing. The temperature-swing can be optimized so that the total work required of the heat pump compressor 502 and vacuum compressor is minimized.

In still another embodiment is a combination in which the heat pump 500 enables a temperature-swing, then as each phase cycle approaches the next transition, the heat pump evaporator 510 and condenser 512 pressures are adjusted to bring the bed temperatures back to near the requirement for the subsequent phase. For DAC, it may be preferable to operate the evaporator 510 heat transfer with a phase one 112 bed so that the bed temperature remains at or near the temperature of the incoming process vapor 114, thereby avoiding heating or cooling this large vapor stream. Then all desired temperature-swing contribution is provided by the control of the condenser heat transfer with a bed in phase two 200 or phase three 300.

According to various embodiments, this process results in the co-production of dry vapor 130 from phase one 112 and water vapor 116 from phase three 300. The recombination of these co-products is an opportunity to recover lost work and reduce the overall process energy requirements. For example, in one embodiment, the phase three 300 water vapor 116 is removed from the beds 120 under vacuum and pressurized in a vacuum compressor 214. This vacuum compressor 214 operating adiabatically at a 30:1 compression ratio will produce low pressure steam >400° C. The heat of compression can be recovered to provide additional heat input for water desorption through the indirect heating of the beds 120 during phase two 200 or phase three 300. This can be accomplished by stepwise heat removal during compression or heat removal from the final compressed steam. One means to transfer this heat is to exchange it with the circulating heat transfer fluid 412 upstream of the beds operating phase two 200 or phase three 300. Ideally, heat is extracted from the phase three 300 water product at a pressure and temperature which results in a condensed and cooled liquid water stream.

This condensed water stream can be flash vaporized into the dry air exiting from a device 100 operating phase one 112 (i.e., the $CO_2$-lean dry vapor 132). The associated coolth can be applied to provide additional cooling for the bed 120 undergoing water adsorption during phase one 112. One means to transfer this coolth from the exiting cooled wet air stream is to exchange it with the circulating heat transfer fluid 412 of the bed operating phase one 112.

Figure 6:
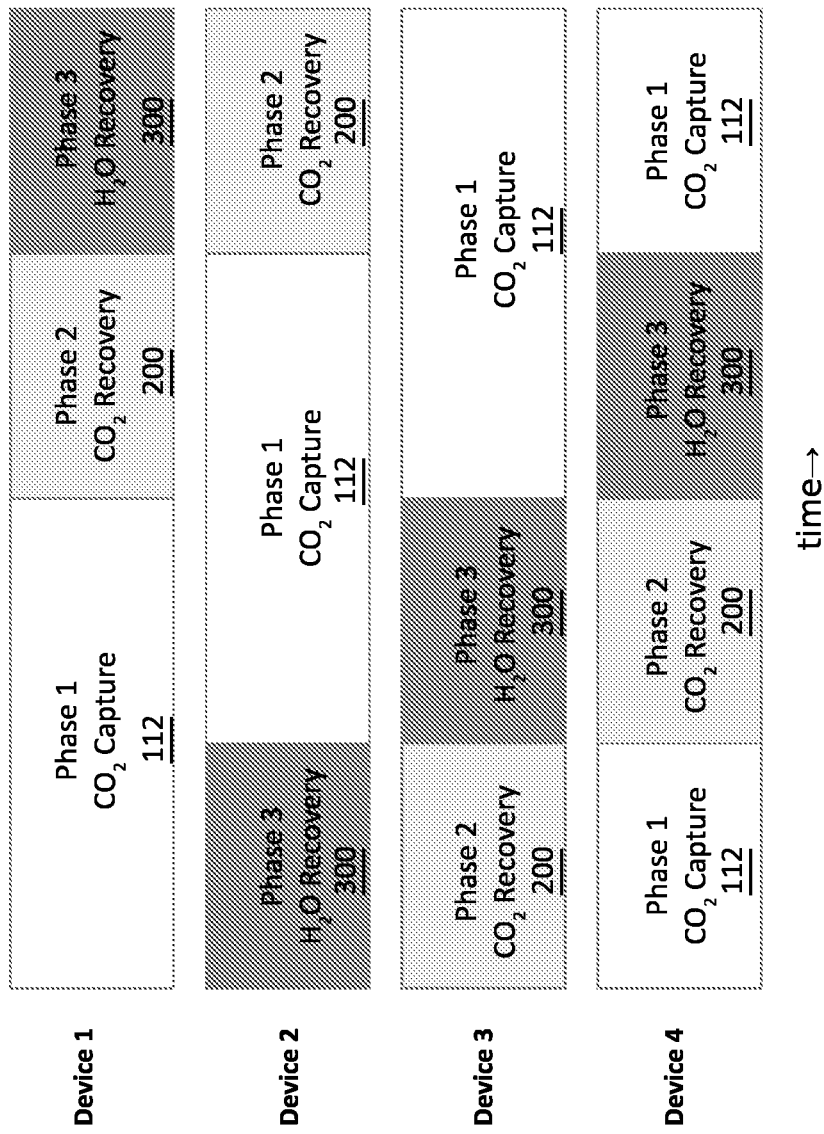
FIG. 6 is a process view of a $CO_2$ capture system having capture devices in different phases.

FIG. 6 is a process view of a non-limiting example of a $CO_2$ capture system 400 having capture devices 100 in different phases. As previously discussed, in some embodiments it is be desirable to have devices 100 operating phase one 112 concurrent with devices 100 operating phases two 200 and three 300 in order to provide simultaneously heat transfer. It also may be preferable to continuously have some devices 100 producing $CO_2$ from phase two 200 to provide uniform flow of product for subsequent purification and compression. The rates of water and $CO_2$ desorption can be varied independently of adsorption/absorption rate by controlling pressure and temperature. FIG. 6 provides a possible device phase sequence arrangement to accommodate these preferences, for the non-limiting example of a system 400 with four devices 100.

Figure 7:
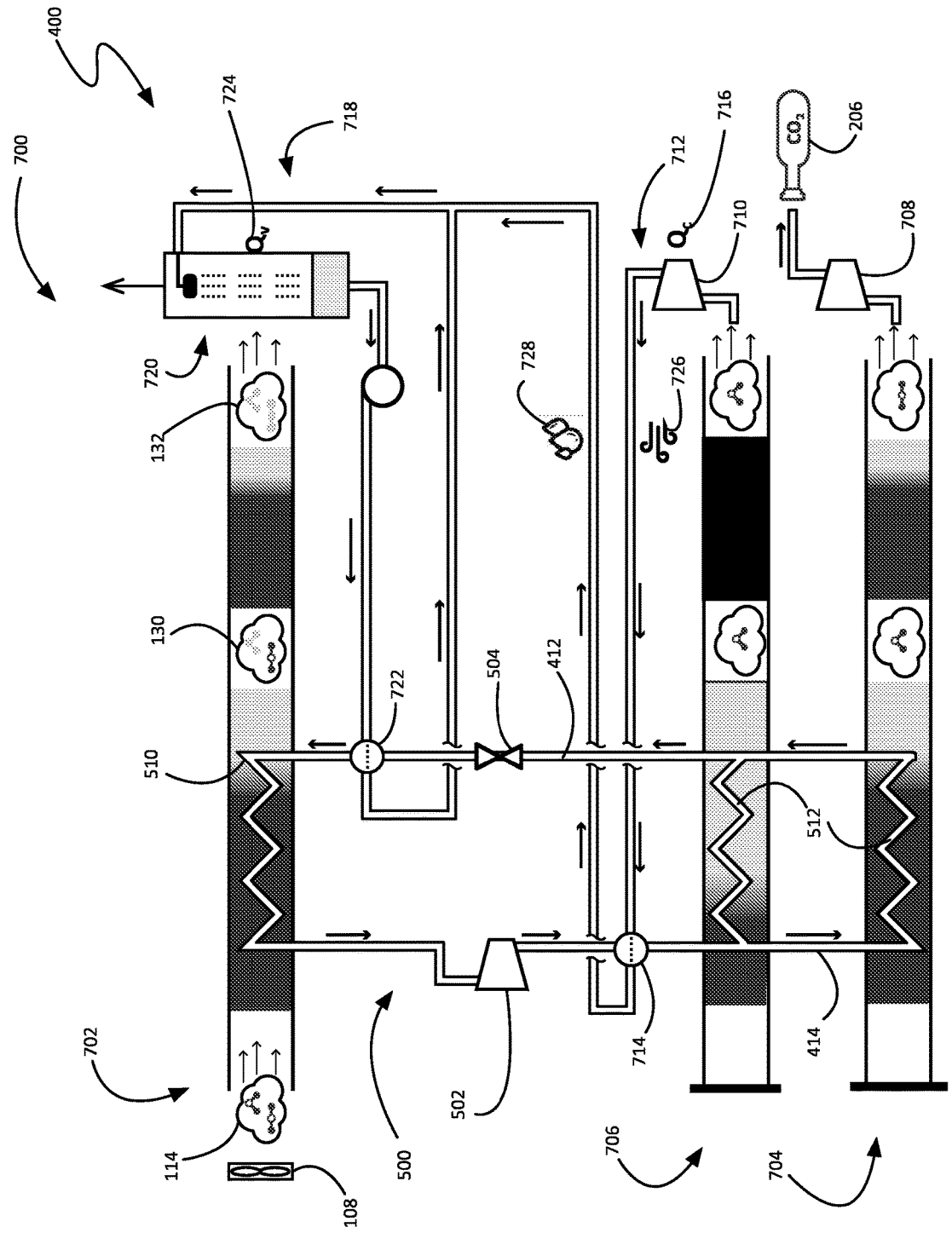
FIG. 7 is schematic view of another $CO_2$ capture system using moisture swing sorbent material.

FIG. 7 is a schematic view of another non-limiting example of a $CO_2$ capture system 400 using a moisture swing $CO_2$ sorbent material 104. Unlike the previous figures, this non-limiting example is based on a plurality of capture device triads 700, each triad 700 having a first device 702 in the first phase 112, a second device 704 in the second phase 200, and a third device 706 in the third phase 300.

This non-limiting example of a DAC-based system 400 employs three different methods of energy management. First, the system 400 comprises a heat pump 500 used to transfer heat between phases. More specifically, circulating heat transfer fluid 412 is used to heat pump thermal energy between devices 100 operating in phase one 112 and devices 100 operating in phase two 200 and phase three 300. According to various embodiments, the system 400 comprises a heat pump 500, which includes a heat transfer fluid 412 circulating within a fluidic loop 414, the fluidic loop 414 also comprising a compressor 502 and a pressure letdown 504. As shown, the heat pump 500 is coupled to the device triad 700 such that the heat pump 500 is in thermal contact with the desiccants 102 of the three devices of the device triad 700, the heat pump 500 configured to transfer heat from the first device 702 in the first phase 112 to the second device 704 in the second phase 200 and the third device 706 in the third phase 300.

Secondly, according to various embodiments, heat additions to devices operating in phase two 200 and phase three 300 can be augmented with additional heat input from the heat of compression 716 of desorbed water vapor 116. As seen in previous figures and exemplary embodiments, the system 400 of FIG. 7 also comprises two vacuum compressors, a second vacuum compressor 708 coupled to the product outlet 110 of the second device 704 and configured to compress the $CO_2$-rich product stream 206 of the second device 704, as well as a third vacuum compressor 710 coupled to the product outlet 110 of the third device 706 and configured to compress the water vapor 116 of the third device 706. A first heat transfer circuit 712 is in fluidic communication with the product outlet 110 of the third device 706 and configured to add, via a first heat exchanger 714, a heat of compression 716 from the second and third vacuum compressors 708, 710, to the fluidic loop 414 of the heat pump 500 in thermal contact with the desiccant 102 of the second device 704 and the third device 706.

Finally, this system 400 augments the heat removal performed on the first device 702 in the first phase 112. According to various embodiments, this heat removal is augmented with additional coolth input from the revaporization of water from phase two 200 into the $CO_2$-lean dry vapor 132 from phase one 112. As shown, this may be done using a second heat transfer circuit 718 that is in fluidic communication with a cooling tower 720 coupled to the first device 702 and configured to remove, via a second heat exchanger 722, a heat of revaporization 724 from the revaporization of water taken the second device 704 into the $CO_2$-lean dry vapor 132 of the first device 702, the heat of revaporization 724 being removed from the fluidic loop 414 of the heat pump 500.

Figure 8:
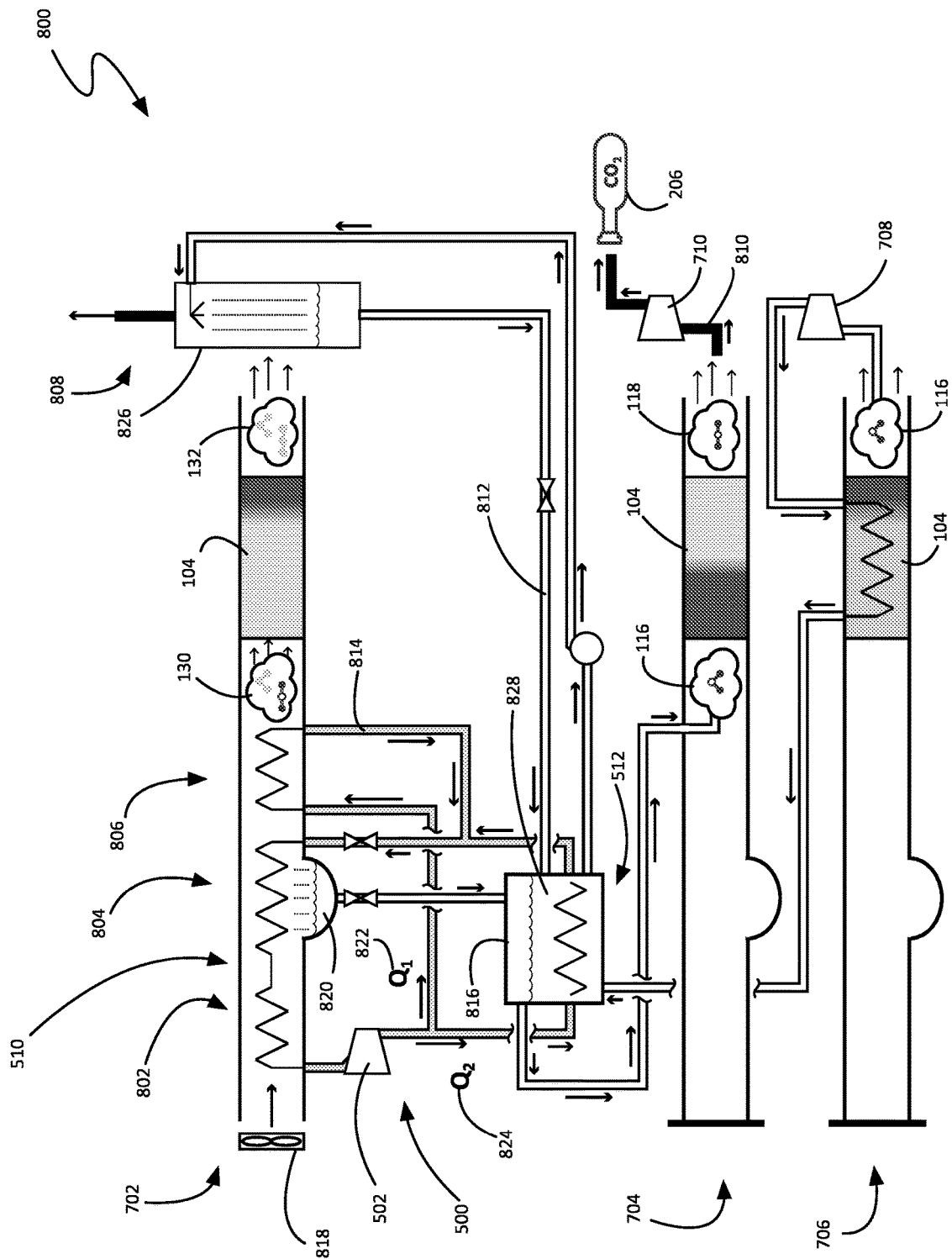
FIG. 8 is schematic view of a $CO_2$ capture system harnessing condensation instead of a desiccant.

FIG. 8 is schematic view of a non-limiting example of a $CO_2$ capture system 800 harnessing condensation instead of a desiccant 102. In some embodiments, the desiccant 102 is eliminated and, instead, the water content of the air is substantially removed by simple condensation. A heat pump 500 with a circulating refrigerant 814 is used. The heat pump refrigerant evaporator 510 reduces the air temperature to the appropriate dewpoint and the condensed water 820 from the air is collected and transferred to a water reservoir 816. The heat pump refrigerant condenser 512 rejects a first portion 822 of heat to reheat the dry air 130 upstream of the $CO_2$ sorbent material 104 and rejects a second portion 824 of heat to the water reservoir 816. The water reservoir temperature is maintained by evaporative cooling, returning a portion or all of the water back into the dry air 130.

One configuration of this process is depicted in FIG. 8. The heat pump refrigerant 814 is reduced in pressure through a valve or other pressure reduction device 504 after which it comprises a liquid phase. The refrigerant 814 is indirectly contacted with ambient air to cool this air and condense water 116 from the air as the refrigerant 814 is vaporized and heated. An efficient means to do this is in a countercurrent flow arrangement so that in a water condenser zone 804 the refrigerant 814 first extracts heat 418 from air which has already been cooled to near its dewpoint (e.g., air precooler 802). On the air side, water condenses from the air and is collected. On the refrigerant side, refrigerant liquid 814 evaporates. In another zone, air initially near ambient temperature is cooled to near its dewpoint temperature while refrigerant 814 comprising vapor is superheated. This arrangement enables heat transfer to be accomplished while maintaining a constantly small temperature difference between the air and the refrigerant 814.

After the refrigerant 814 extracts heat 418 from the air, it is compressed. A portion of the compressed refrigerant may be indirectly contacted with water which was previously collected as condensate 820 from ambient air received via the air intake 818 so that the water is heated and a portion of the refrigerant 814 is condensed. Another portion of the compressed refrigerant may be indirectly contacted with the dry, cooled air 140 to reheat this air in advance of $CO_2$ capture in the sorbent material bed 104, and to condense or cool a portion of the refrigerant 814. These heat transfer steps may be performed in parallel as shown in FIG. 8, or in series. Parallel arrangement advantageously allows control on the portion of refrigerant 814 directed to reheat the air so that the air temperature and relative humidity can be set to preferred conditions for $CO_2$ capture. Series arrangement with refrigerant 814 firstly condensed in indirect contact with the water reservoir 816 and secondly subcooled in indirect contact with the dry air 130 advantageously enables heat transfer to be accomplished while maintaining a constantly small temperature difference. In parallel or series arrangement, the refrigerant pressure can be controlled at different levels in the water heat exchanger and air heat exchanger to enable different, preferred temperatures.

The water reservoir temperature is maintained by evaporative cooling. One means to provide evaporative cooling is by circulating the reservoir water through a contactor 826 in which it is exposed to the dry, $CO_2$-depleted air 132 exiting the sorbent material bed 104 toward the air exhaust 808 during phase one 112 $CO_2$ capture. Another means to provide evaporative cooling is to connect the water reservoir 816 to the inlet of the sorbent material bed 104 during phase two 200 $CO_2$ recovery such that water 116 is evaporated from the reservoir 816 and drawn to the sorbent material bed 104 to effect $CO_2$ desorption. It may be preferable to perform both of these evaporative cooling steps simultaneously in multiple devices 100 operating asynchronously. If a single water reservoir 816 is employed, it may be under partial vacuum and connected to the inlet of the sorbent material bed 104 while $CO_2$ is being removed from that bed through a vacuum compressor 708.

During phase one 112 $CO_2$ recovery, the water condensate 820 removed from the air will contain some dissolved $CO_2$ 828. When this water is exposed to vacuum and drawn to the sorbent material bed 104 under vacuum during phase two 200 $CO_2$ recovery, a substantial amount of the dissolved $CO_2$ 828 will be removed and recovered as product 810 contributing to the overall system yield.

During phase three 300 water recovery, water 116 is removed from the sorbent material bed 104 under vacuum. The vacuum compressor discharge is principally water which will be steam until cooled and condensed. This steam may be cooled and condensed with indirect heat transfer to the sorbent material bed 104 in order to enhance water desorption as shown in FIG. 8. Other options, not shown, include indirect heat transfer to the sorbent material bed 104 with inter-stage vacuum compressor fluid so that compressor work is reduced and the maximum bed temperature is limited, indirect heat transfer from the inter-stage or discharge vacuum compressor fluid with the phase one 112 dry air 130 to increase the air reheat temperature upstream of the sorbent material bed 104, and indirect heat transfer from the inter-stage or discharge vacuum compressor fluid with the phase one dry air 130 in the air exhaust or with ambient air to remove surplus heat.

The water recovered during phase three 300 water recovery may be condensed, cooled and returned to the water reservoir 816, as shown in FIG. 8, so that it is available for evaporative cooling. Alternatively, the water 812 may be recovered as a steam or water condensate byproduct.

The net energy required for removing water from the air by condensation is largely represented by the work performed by the heat pump 502 compressor. As temperature differences between hot and cold fluids are minimized so is the compressor energy requirement. In an ideal, reversible process, as the temperature differences approach zero, the compressor energy requirement approaches zero. By the including superheating of refrigerant vapor in the air precooler and subcooling of refrigerant liquid in the air reheater 806, the temperature differences between air and refrigerant through this cycle are minimized to achieve a high system efficiency.

Where the above examples, embodiments and implementations reference examples, it should be understood by those of ordinary skill in the art that other carbon dioxide capture units, sorbent and desiccant materials, systems and methods could be intermixed or substituted with those provided. In places where the description above refers to particular embodiments of a system, device, and method for carbon dioxide capture in humid conditions, it should be readily apparent that a number of modifications may be made without departing from the spirit thereof and that these embodiments and implementations may be applied to other carbon dioxide capture technologies as well. Accordingly, the disclosed subject matter is intended to embrace all such alterations, modifications and variations that fall within the spirit and scope of the disclosure and the knowledge of one of ordinary skill in the art.

What is claimed is:

1. A device for carbon dioxide capture, comprising:
a desiccant;
a $CO_2$ sorbent material;
a vessel enclosing the desiccant and the $CO_2$ sorbent material, the vessel comprising a vapor intake and a product outlet;
wherein the device is configured to cycle between a first phase, a second phase, and a third phase;
wherein the first phase comprises a process vapor comprising water vapor and carbon dioxide gas being received into the vessel through the vapor intake at an intake pressure, the process vapor passing through the desiccant and the $CO_2$ sorbent material, the desiccant absorbing at least a portion of the water vapor in the process vapor resulting in a dry vapor, the $CO_2$ sorbent material absorbing carbon dioxide from the dry vapor resulting in a $CO_2$-lean dry vapor, the portion of the water vapor absorbed by the desiccant being large enough that the $CO_2$ sorbent material absorbs carbon dioxide from the dry vapor uninhibited by a remaining water;
wherein the second phase comprises the vapor intake being closed and at least one of a first pressure downstream from the desiccant being reduced below the intake pressure and a temperature of the desiccant being increased, resulting in the desorption of water from the desiccant and the desorption of carbon dioxide from the $CO_2$ sorbent material in response to the water desorbed from the desiccant being in direct contact with the $CO_2$ sorbent material, the second phase further comprising a $CO_2$-rich product stream being removed through the product outlet; and
wherein the third phase comprises the remaining water being desorbed from both the desiccant and the $CO_2$ sorbent material as recovered water.

2. The device of claim 1, further comprising:
a $CO_2$ concentration sensor inside the vessel, downstream from the $CO_2$ sorbent material in the direction of the process vapor; and
a water concentration sensor inside the vessel, downstream from the $CO_2$ sorbent material in the direction of the process vapor;
wherein the device is configured to transition from the first phase to the second phase in response to an increase in the $CO_2$ concentration downstream from the $CO_2$ sorbent material; and
wherein the device is configured to transition from the second phase to the third phase in response to an increase in the water concentration downstream from the $CO_2$ sorbent material.

3. The device of claim 1, wherein the desiccant and the $CO_2$ sorbent material are each contained within at least one bed within the vessel, and wherein the sorption and desorption of at least one of water and carbon dioxide within each of the at least one bed progresses downstream as a moving mass transfer front during each phase.

4. The device of claim 3, wherein the desiccant and the $CO_2$ sorbent material are in the same bed.

5. The device of claim 4, wherein the desiccant and the $CO_2$ sorbent material are comingled and are one of mixed homogeneously and mixed to gradually change from substantially desiccant to substantially $CO_2$ sorbent material across the bed.

6. The device of claim 3, wherein the desiccant and the $CO_2$ sorbent material are in separate beds.

7. The device of claim 1, wherein the intake pressure is proximate atmospheric pressure.

8. The device of claim 1, further comprising:
a first vacuum compressor coupled to the vessel downstream from the $CO_2$ sorbent material;
wherein the first pressure downstream of the desiccant is established and maintained by the first vacuum compressor.

9. The device of claim 1, further comprising a liquid pump configured to place the water desorbed from the desiccant in the second phase in direct contact with the $CO_2$ sorbent material.

10. The device of claim 1, wherein the desiccant and the $CO_2$ sorbent material are the same.

11. A method for carbon dioxide capture, comprising:
receiving a process vapor into a vessel through a vapor intake at an intake pressure, the process vapor comprising water vapor and carbon dioxide gas, the vessel comprising a desiccant and a $CO_2$ sorbent material;
passing the process vapor through the desiccant and the $CO_2$ sorbent material, the desiccant absorbing at least a portion of the water vapor in the process vapor resulting in a dry vapor, the $CO_2$ sorbent material absorbing carbon dioxide from the dry vapor resulting in a $CO_2$-lean dry vapor, the portion of the water vapor absorbed by the desiccant being large enough that the $CO_2$ sorbent material absorbs carbon dioxide from the dry vapor uninhibited by a remaining water;
discontinuing the process vapor by closing the vapor intake;
desorbing the water from the desiccant by at least one of reducing a first pressure downstream from the desiccant to below the intake pressure and increasing a temperature of the desiccant;
desorbing the carbon dioxide from the $CO_2$ sorbent material by placing the water desorbed from the desiccant in direct contact with the $CO_2$ sorbent material;
removing the desorbed carbon dioxide through the product outlet as a product stream; and
desorbing the remaining water from the desiccant and the $CO_2$ sorbent material.

12. The method of claim 11:
wherein the vapor intake is closed, discontinuing the process vapor, in response to a $CO_2$ sensor within the vessel observing an increase in the $CO_2$ concentration downstream from the $CO_2$ sorbent material; and wherein the vapor intake is closed, discontinuing the process vapor, in response to a water sensor within the vessel observing an increase in the $CO_2$ concentration downstream from the $CO_2$ sorbent material.

13. The method of claim 11, wherein the first pressure downstream of the desiccant is reduced to below the intake pressure using a first vacuum compressor coupled to the vessel downstream from the $CO_2$ sorbent material.

14. The method of claim 11, wherein the water desorbed from the desiccant is placed in direct contact with the $CO_2$ sorbent material using a liquid pump.

15. A system for carbon dioxide capture, comprising:
  a plurality of $CO_2$ capture devices, each device comprising:
    a desiccant;
    a $CO_2$ sorbent material; and
    a vessel enclosing the desiccant and the $CO_2$ sorbent material, the vessel comprising a vapor intake and a product outlet;
  wherein the device is configured to cycle between a first phase, a second phase, and a third phase;
  wherein the first phase comprises a process vapor comprising water vapor and carbon dioxide gas being received into the vessel through the vapor intake at an intake pressure, the process vapor passing through the desiccant and the $CO_2$ sorbent material, the desiccant absorbing at least a portion of the water vapor in the process vapor resulting in a dry vapor, the $CO_2$ sorbent material absorbing carbon dioxide from the dry vapor resulting in a $CO_2$-lean dry vapor, the portion of the water vapor absorbed by the desiccant being large enough that the $CO_2$ sorbent material absorbs carbon dioxide from the dry vapor uninhibited by a remaining water;
  wherein the second phase comprises the vapor intake being closed and at least one of a first pressure downstream from the desiccant being reduced below the intake pressure and a temperature of the desiccant being increased, resulting in the desorption of water from the desiccant and the desorption of carbon dioxide from the $CO_2$ sorbent material in response to the water desorbed from the desiccant being in direct contact with the $CO_2$ sorbent material, the second phase further comprising a $CO_2$-rich product stream being removed through the product outlet; and
  wherein the third phase comprises the remaining water being desorbed from both the desiccant and the $CO_2$ sorbent material as recovered water.

16. The system of claim 15, wherein each $CO_2$ capture device further comprises:
  a $CO_2$ concentration sensor inside the vessel, downstream from the $CO_2$ sorbent material in the direction of the process vapor; and
  a water concentration sensor inside the vessel, downstream from the $CO_2$ sorbent material in the direction of the process vapor;
  wherein each device of the plurality of devices is configured to transition from the first phase to the second phase in response to an increase in the $CO_2$ concentration downstream from the $CO_2$ sorbent material; and
  wherein each device of the plurality of devices is configured to transition from the second phase to the third phase in response to an increase in the water concentration downstream from the $CO_2$ sorbent material.

17. The system of claim 15 wherein, for each $CO_2$ capture device of the plurality of $CO_2$ capture devices, the desiccant and the $CO_2$ sorbent material are each contained within at least one bed within the vessel of that device, and wherein the sorption and desorption of at least one of water and carbon dioxide within each of the at least one bed of that device progresses downstream as a moving mass transfer front during each phase.

18. The system of claim 15, the system further comprising:
  a plurality of device pairs composed of the plurality of $CO_2$ capture devices, each device pair comprising a first device and a second device; and
  a plurality of heat transfer circuits, each heat transfer circuit comprising a heat transfer fluid circulating in a fluidic loop via a pump, each heat transfer circuit coupled to a different device pair such that the heat transfer circuit is in thermal contact with the desiccant of the first device and the second device;
  wherein the first device and the second device are out of phase such that, when the first device is in the first phase, the second device is in either the second phase or the third phase;
  wherein each heat transfer circuit is configured to transfer heat between the devices in the device pair such that the heat transfer fluid is indirectly heated by the desiccant of the device in the first phase and cooled as it transfers heat to the desiccant of the device in the second phase or third phase.

19. The system of claim 15, the system further comprising:
  a plurality of device pairs composed of the plurality of $CO_2$ capture devices, each device pair comprising a first device and a second device; and
  a plurality of heat pumps, each heat pump comprising a heat transfer fluid circulating in a fluidic loop comprising a compressor and a pressure letdown, each heat pump coupled to a different device pair such that the heat pump is in thermal contact with the desiccant of the first device and the second device;
  wherein the first device and the second device are out of phase such that, when the first device is in the first phase, the second device is in either the second phase or the third phase;
  wherein each heat pump is configured to transfer heat from a lower temperature in the desiccant of the device in the first phase to a higher temperature in the desiccant of the device in the second phase or the third phase.

20. The system of claim 15, the system further comprising:
  a plurality of device triads composed of the plurality of $CO_2$ capture devices, each device triad comprising a first device in the first phase, a second device in the second phase, and a third device in the third phase, each device triad comprising:
  a heat pump comprising a heat transfer fluid circulating in a fluidic loop, the fluidic loop comprising a compressor and a pressure letdown, the heat pump coupled to the device triad such that the heat pump is in thermal contact with the desiccants of the three devices of the device triad, the heat pump configured to transfer heat from the first device in the first phase to the second device in the second phase and the third device in the third phase;

a second vacuum compressor coupled to the product outlet of the second device and configured to compress the $CO_2$-rich product stream of the second device;

a third vacuum compressor coupled to the product outlet of the third device and configured to compress the water vapor of the third device;

a first heat transfer circuit in fluidic communication with the product outlet of the third device and configured to add, via a first heat exchanger, a heat of compression from the second and third vacuum compressors to the fluidic loop of the heat pump in thermal contact with the desiccant of the second device and the third device;

a second heat transfer circuit in fluidic communication with a cooling tower coupled to the first device and configured to remove, via a second heat exchanger, a heat of revaporization from the revaporization of water from the second device into the $CO_2$-lean dry vapor of the first device, the heat of revaporization being removed from the fluidic loop of the heat pump.

* * * * *